March 1, 1932.   J. W. WILDERMUTH   1,847,156
GLASS APPARATUS
Filed Feb. 6, 1929   3 Sheets-Sheet 1

Inventor
Jesse W. Wildermuth
By Frank Fraser
Attorney

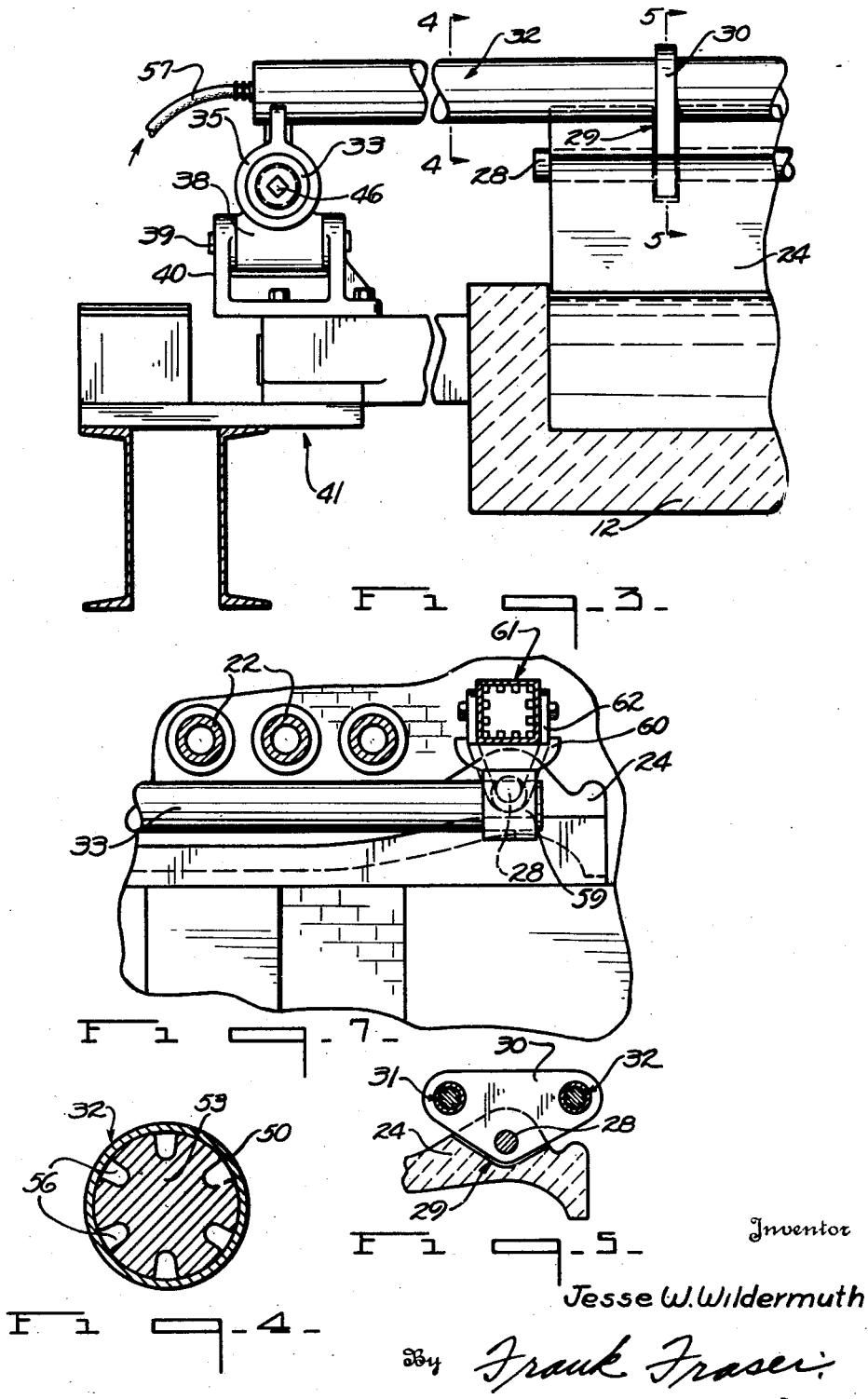

March 1, 1932. J. W. WILDERMUTH 1,847,156
GLASS APPARATUS
Filed Feb. 6, 1929 3 Sheets-Sheet 3
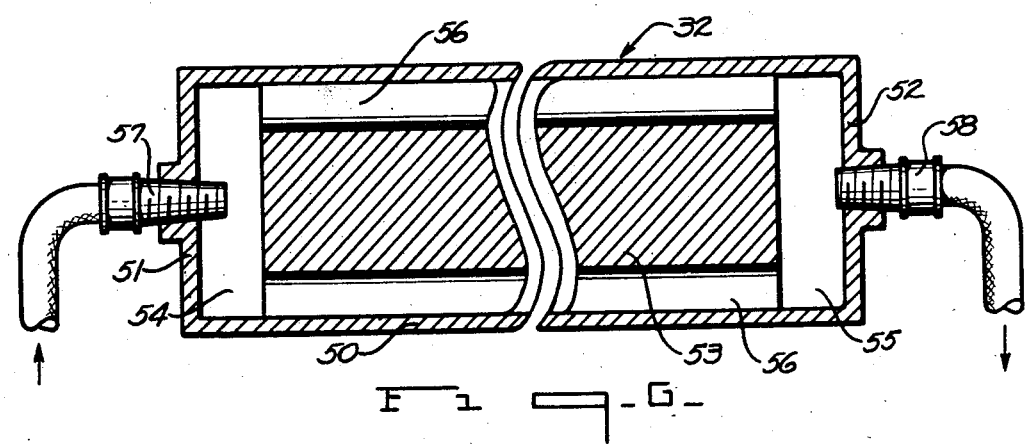
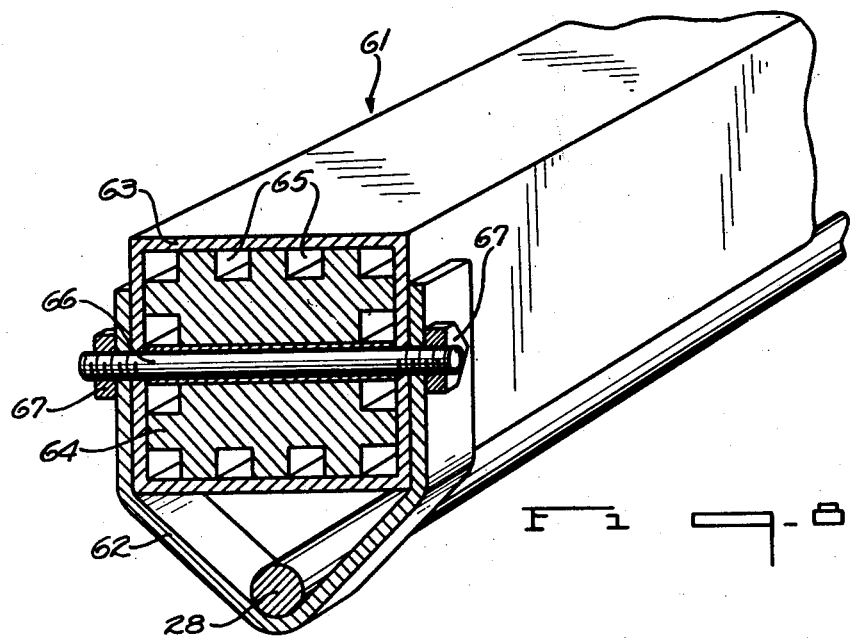
Inventor
Jesse W. Wildermuth
By Frank Fraser,
Attorney Patented Mar. 1, 1932

1,847,156

UNITED STATES PATENT OFFICE

JESSE W. WILDERMUTH, OF LANCASTER, OHIO, ASSIGNOR TO LIBBEY-OWENS-FORD GLASS COMPANY, OF TOLEDO, OHIO, A CORPORATION OF OHIO

GLASS APPARATUS

Application filed February 6, 1929. Serial No. 337,762.

The present invention relates broadly to glass apparatus and more particularly to apparatus for use in the production of sheet or plate glass.

According to this invention, a mass or body of molten glass contained within a receptacle is adapted to be moved upwardly therefrom through a sheet forming pass, created between two cylindrical members or rolls, and reduced to a sheet of uniform and substantially predetermined thickness. The forming apparatus also includes preferably a third cylindrical member or roll arranged above the sheet forming pass and over which the sheet is deflected from the vertical into the horizontal plane, said sheet being subsequently annealed while traveling horizontally. Arranged at opposite sides of the cylindrical members or rolls, creating the sheet forming pass, are lip tiles or the like provided to protect the rolls and the sheet formed thereby from heat, gases, etc.

An important object of the invention resides in the provision of novel and improved means for supporting one of the lip tiles in such a manner that its position may be varied relative to the mass of molten glass within the receptacle and also relative to the sheet being formed.

Another object of the invention involves the provision of improved means of a practical construction whereby the desired adjustments of the lip tile may be easily and quickly effected without disturbing the forming of the sheet or other parts of the machine.

A further object of the invention involves the provision of means for adjustably supporting the tip tile in such manner that it may be raised and lowered with respect to the mass of molten glass as desired and also adjusted horizontally with respect to the sheet and forming rolls.

Other objects and advantages of the invention will become more apparent during the course of the following description when taken in connection with the accompanying drawings.

In the drawings forming a part of this application and wherein like numerals are employed to designate like parts throughout the same, Fig. 1 is a fragmentary vertical sectional view through the sheet forming apparatus.

Fig. 3 is an end view of the supporting and adjusting means.

Fig. 4 is a transverse section through one of the lip tile supporting members taken substantially on line 4—4 of Fig. 3.

Fig. 5 is a section taken substantially on line 5—5 of Fig. 3.

Fig. 6 is a longitudinal sectional view through one of the lip tile supporting members.

Fig. 7 is a side elevation showing a slightly modified supporting means, and

Fig. 8 is a perspective transverse section through the lip tile supporting member of Fig. 7.

Figure 1:
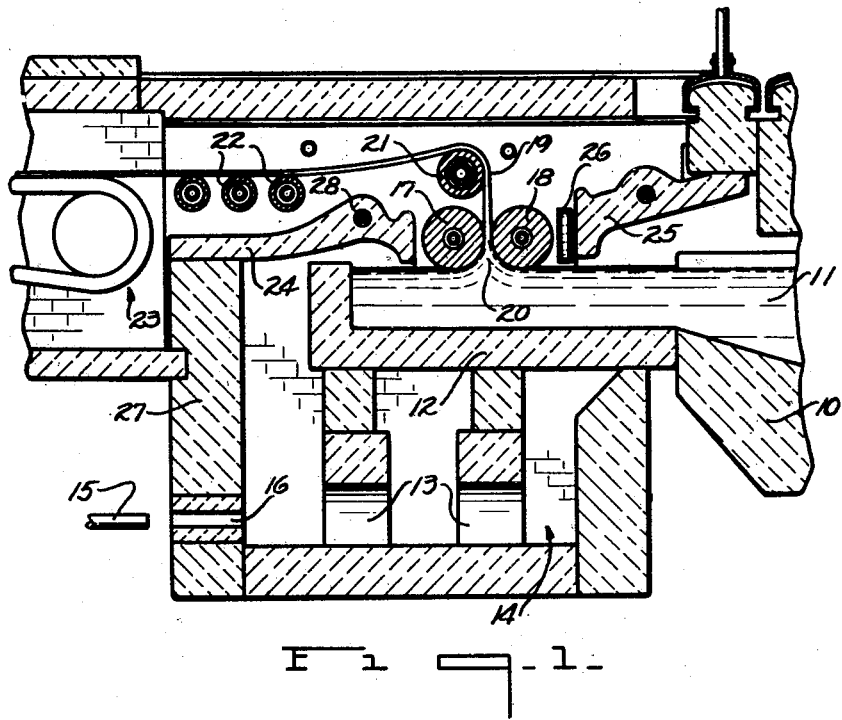
Figure 2:
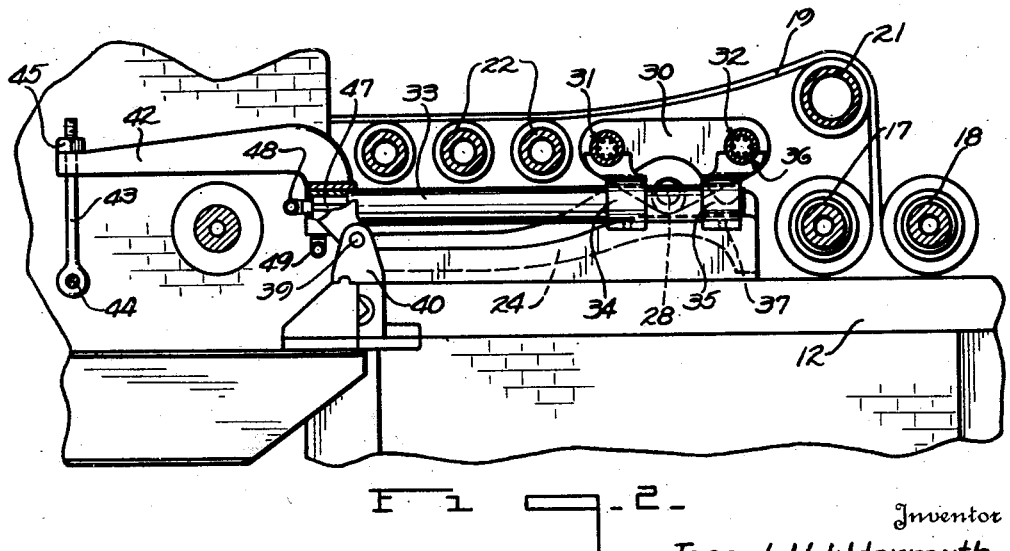
Fig. 2 is an elevation thereof, partially in section, showing the means for supporting and adjusting the lip tile.

Referring to Fig. 1, the numeral 10 designates a tank furnace adapted to contain a mass of molten glass 11 which may be continuously or substantially continuously supplied to the working receptacle or draw pot 12. The working receptacle 12 is supported upon stools 13 contained in a chamber 14, the temperature of which may be controlled by means of burners or the like 15 operating through ports 16. The working receptacle or pot 12 is preferably designed to contain a relatively shallow mass of molten glass.

Positioned transversely of the pot 12 is a pair of rotatable forming members or rolls 17 and 18 respectively preferably formed so that the lower portions of the peripheries thereof may be arranged within the pot in a manner that they contact with the surface of the molten glass therein. The rolls are also preferably positively driven and mounted with respect to one another so as to create a sheet forming pass therebetween. The molten glass is adapted to be moved upwardly from the pot 12 through the sheet forming pass and rolled by the members 17 and 18 to a sheet 19 of uniform substantially predetermined thickness. A heavy meniscus or source of supply 20 furnishes sufficient glass to the sheet forming pass between the rolls to allow an actual rolling of the glass. The sheet 19 may be moved vertically from the sheet forming pass for a desired distance and subsequently deflected into the horizontal plane over a third roll 21 and passed onto a series of supporting rolls 22. Adjacent the series of rolls 22 and adapted to receive the sheet therefrom is a flattening table designated in its entirety by the numeral 23, the sheet passing from this table into and through a horizontal annealing leer, not shown.

To protect the forming rolls 17 and 18 and the sheet formed thereby from heat, gases, etc., issuing from the furnace 10 and pot chamber 14, it is preferred that cover or lip tiles 24 and 25 be used, these being arranged at opposite sides of the forming rolls above the mass of molten glass contained within receptacle 12. Positioned between the lip tile 25 and roll 18 is a water-cooled shield 26. The present invention relates particularly to improved means for supporting and adjusting the lip tile 24 in a manner that it may be moved vertically with respect to the mass of molten glass within pot 12 and likewise horizontally towards and away from the forming rolls and sheet. These adjustments are desirable as the position of the lip tile should be varied if necessary during the forming of the sheet to meet varying working and temperature conditions. The lip tile 24 is arranged at the closed end of pot 12 remote from furnace 10 and is supported at its rear end upon the front wall 27 of compartment 14. One method of adjustably supporting the lip tile consists in arranging a rod 28 transversely of the pot and extending longitudinally through an opening in said lip tile adjacent the forward or outer end thereof. The lip tile is provided in the top thereof with a plurality of spaced recesses or notches 29 within which are inserted the lower ends of triangular shaped hanger plates 30 provided with openings through which the rod 28 extends. Arranged above the lip tile and also extending longitudinally thereof are the spaced horizontal supporting members 31 and 32 which also extend through openings in the hanger plates 30 whereby the lip tile is hung or suspended from said members.

Arranged at each end of the lip tile is a substantially horizontal arm 33 upon which are slidably mounted collars or the like 34 and 35. These collars are provided with notches 36 in their upper ends within which are received the corresponding ends of members 31 and 32. The collars 34 and 35 are slidable along the arms 33 so as to effect movement of the lip tile horizontally towards and away from the forming rolls and sheet, said collars being held in adjusted position by means of set screws or the like 37. Each arm 33 is carried at its inner end by a member or block 38 having a pivotal mounting as at 39 within the bearing bracket 40 carried upon the fixed supporting structure 41.

Also carried by the member 38 is a rearwardly projecting lever 42 having a vertical opening at its outer end through which is received the upper end of bolt 43 pivoted at its lower end as at 44. Threaded upon the upper end of the bolt and bearing against lever 42 is a nut or the like 45. Upon movement of lever 42, the corresponding arm 33 can be rocked about its pivot to raise and lower the lip tile with respect to the mass of molten glass within pot 12. Thus, each end of the lip tile is independently adjustable and can be secured in properly adjusted position by means of bolt 43 and nut 45.

The arms 33 are ordinarily subjected to an intense heat and it is therefore desirable that means be provided for internally cooling the same. To this end, the arms are hollow in the form of pipes, having their outer ends closed by plugs 46. Arranged within each arm is a longitudinally extending pipe 47 which may be provided with a plurality of openings longitudinally thereof or, if desired, this pipe may have its outer end open and spaced from the closed end of the arm. In either case, however, the water or other cooling fluid is adapted to be supplied to the pipe 47 through an inlet 48, this water then passing from the pipe into the arm and subsequently outwardly thereof through the outlet 49. The lip tile supporting members 31 and 32 are likewise preferably internally cooled.

As shown particularly in Figs. 4 and 6, each of the members 31 and 32 comprises an outer cylindrical shell 50 closed at its opposite ends by the end walls 51 and 52 and having disposed therein a longitudinally extending cylindrical core 53. The core 53 fits snugly within shell 50 but is somewhat shorter than the same and spaced from the opposite ends thereof to provide the end chambers 54 and 55. The core is also provided, preferably at equi-distantly spaced points around the periphery thereof, with a plurality of longitudinally extending grooves or ducts 56 open at their opposite ends and communicating with chambers 54 and 55. Associated with the end wall 51 of shell 50 and communicating with chamber 54 is an inlet pipe 57 while associated with the opposite end wall 52 of said shell and communicating with chamber 55 is an outlet pipe 58. The water or other cooling medium is adapted to enter the chamber 54 through inlet pipe 57 and is then adapted to flow from chamber 54 through the longitudinally extending grooves or ducts 56 into chamber 55, the said water passing outwardly from the chamber 55 through outlet pipe 58. Thus, a suitable cooling medium may be continuously circulated through each of the supporting members 31 and 32 whereby to prevent overheating and sagging thereof.

In Figs. 7 and 8 is disclosed a slightly modified type of supporting means for the lip tile. In this instance, each of the arms 33 is adapted to slidably receive thereon a collar or sleeve 59 preferably provided with a supporting portion 60 at its upper end having a recess in the upper surface thereof. The supporting members 31 and 32 described hereinabove are eliminated and there is provided in lieu thereof a single supporting member 61 preferably square or angular in cross section and supported at its opposite ends upon the collars 59, being received within the recesses in the upper surfaces thereof. Carried by the supporting member 61 are a plurality of depending straps or slings 62 which are adapted to be received within the recesses 29 in lip tile 24 and to support the rod 28 in such a manner that the lip tile will be hung from the single supporting member. The collars 59 may be moved along the arms 33 to effect horizontal adjustment of the lip tile and likewise, the arms 33 are adapted to be pivotally mounted in the manner above described to effect vertical adjustment of the lip tile. As shown in Fig. 8, the single supporting member 61 also consists of an outer shell 63 preferably square or rectangular in cross section and having positioned therein the longitudinally extending core 64, said core being provided at its outer edges with a plurality of spaced longitudinally extending grooves or ducts 65 through which a suitable temperature control medium is adapted to be circulated in the same manner as described hereinabove in connection with the form of the invention illustrated in Figs. 1 to 6. The straps or slings 62 may be secured in position by means of bolts 66 extending transversely through the shell and core and having nuts 67 threaded upon the opposite ends thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, pivotally mounted means for supporting a lip tile adapted for use therein, and means for effecting horizontal adjustment of the lip tile with respect to the supporting means.

2. In sheet glass apparatus, pivotally mounted means for supporting a lip tile adapted for use therein, means for moving the supporting means about its pivotal point to effect vertical adjustment of the lip tile and means for effecting horizontal adjustment of the lip tile with respect to the supporting means.

3. In sheet glass apparatus, means for supporting a lip tile adapted for use therein including a pivotally mounted arm, means for rocking the arm about its pivot to effect vertical adjustment of the lip tile, and means for internally cooling said arm.

4. In sheet glass apparatus, means for supporting a lip tile adapted for use therein including a pivotally mounted arm arranged at each end thereof, means carried by the arms for supporting the adjacent ends of the lip tile, said means being adjustable along said arms to effect movement of the lip tile horizontally and means for rocking said arms to effect vertical adjustment of the lip tile.

5. In sheet glass apparatus, means for supporting a lip tile adapted for use therein including a member extending longitudinally thereof and adapted to carry the same, said member projecting beyond the lip tile at opposite ends thereof, a pivotally mounted arm for supporting each end of said member, means carried by said arms and upon which the opposite ends of said member are adapted to rest, said means being adjustable along said arms to effect movement of the lip tile horizontally, and means for rocking said arms about their pivots to effect vertical adjustment of the lip tile.

6. In sheet glass apparatus, means for supporting a lip tile adapted for use therein including a member extending longitudinally thereof and adapted to carry the same, said member projecting beyond the lip tile at opposite ends thereof, a pivotally mounted arm at each end of the lip tile, a collar slidably carried by each arm and upon which the adjacent end of said member is adapted to rest, said collars being adjustable along said arms to move the lip tile horizontally, means for rocking the arms to effect vertical adjustment of the lip tile, and means for internally cooling said arms.

7. In sheet glass apparatus, means for supporting a lip tile adapted for use therein including a member extending longitudinally thereof, hanger plates carried by the member and connected with the lip tile whereby said lip tile is suspended beneath said member, an arm arranged at each end of the lip tile, a collar carried by each arm for supporting the adjacent end of said member, said collars being slidable along said arms to move the lip tile horizontally.

8. In sheet glass apparatus, means for supporting a lip tile adapted for use therein including a member extending longitudinally thereof, hanger plates carried by the member and connected with the lip tile whereby said lip tile is suspended beneath said member, a pivotally mounted arm arranged at each end of the lip tile, a collar carried by each arm for supporting the adjacent end of said member, said collars being slidable along said arms to move the lip tile horizontally, and means for rocking said arms about their pivots to effect vertical adjustment of the lip tile.

9. In sheet glass apparatus, means for supporting a lip tile adapted for use therein including a shaft extending longitudinally therethrough, a member arranged above the lip tile and also extending longitudinally thereof, hanger plates receiving the shaft and member therethrough whereby the lip tile is suspended from said member, said member projecting beyond the lip tile at opposite ends thereof, a pivotally mounted arm arranged at each end of the lip tile, a collar carried by each arm for supporting the adjacent end of said member, said collars being slidable along said arms to move the lip tile horizontally, and means for rocking said arms about their pivots to effect vertical adjustment of the lip tile.

Signed at Lancaster, in the county of Fairfield and State of Ohio, this 22d day of January, 1929.

JESSE W. WILDERMUTH.